United States Patent [19]

Nishikawa

[11] 4,310,063
[45] Jan. 12, 1982

[54] POWER STEERING DEVICE FOR VEHICLES

[75] Inventor: Masao Nishikawa, Tokyo, Japan

[73] Assignee: Honda Giken Kogyo Kabushiki Kaisha, Tokyo, Japan

[21] Appl. No.: 107,594

[22] Filed: Dec. 27, 1979

[30] Foreign Application Priority Data

Dec. 29, 1978 [JP] Japan .................. 53-163680

[51] Int. Cl.³ .............................................. B62D 5/08
[52] U.S. Cl. .................................... 180/143; 74/492; 91/375 A; 91/434
[58] Field of Search ............... 180/143, 141, 142, 148; 91/434, 375 A; 64/27 B; 74/492

[56] References Cited

U.S. PATENT DOCUMENTS

| | | | |
|---|---|---|---|
| 3,808,838 | 5/1974 | Bowen et al. | 74/492 |
| 3,994,361 | 11/1976 | Nishikawa | 180/143 |
| 4,000,785 | 1/1977 | Nishikawa | 180/143 |
| 4,034,825 | 7/1977 | Adams | 180/143 |

Primary Examiner—Joseph F. Peters, Jr.
Assistant Examiner—Donn McGiehan
Attorney, Agent, or Firm—Irving M. Weiner; Pamela S. Burt; John L. Shortley

[57] ABSTRACT

A power steering device for vehicles including powering means for providing vehicle wheels with power assistance when the vehicle is steered, control means for controlling the powering means based on a steering direction of a steering wheel, and returning means for normally urging the control means to a neutral position. Resilient means such as a torsion bar is disposed between the returning means and the steering wheel for rotational displacement with a substantially linear spring constant, responsive to the steering torque, for thereby providing a variable steering ratio.

9 Claims, 7 Drawing Figures

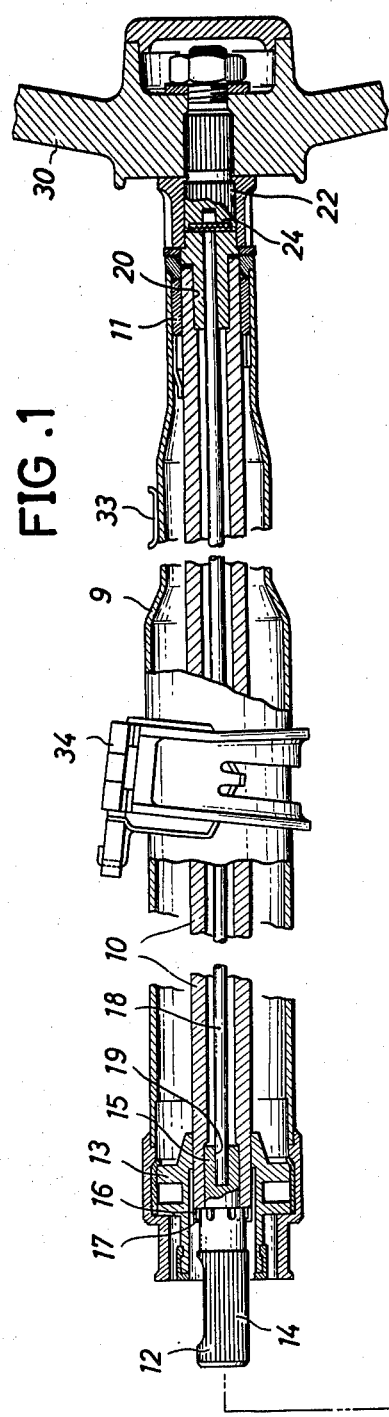
FIG. 1
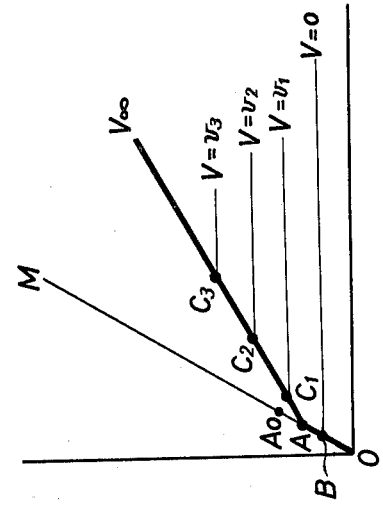
FIG. 2
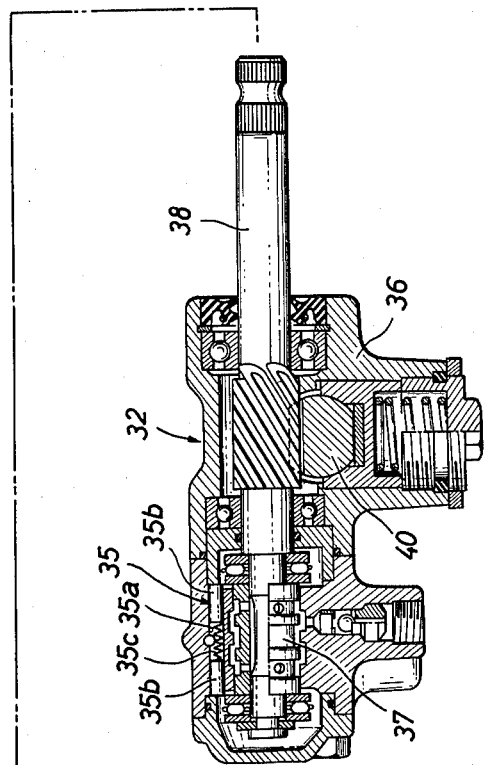

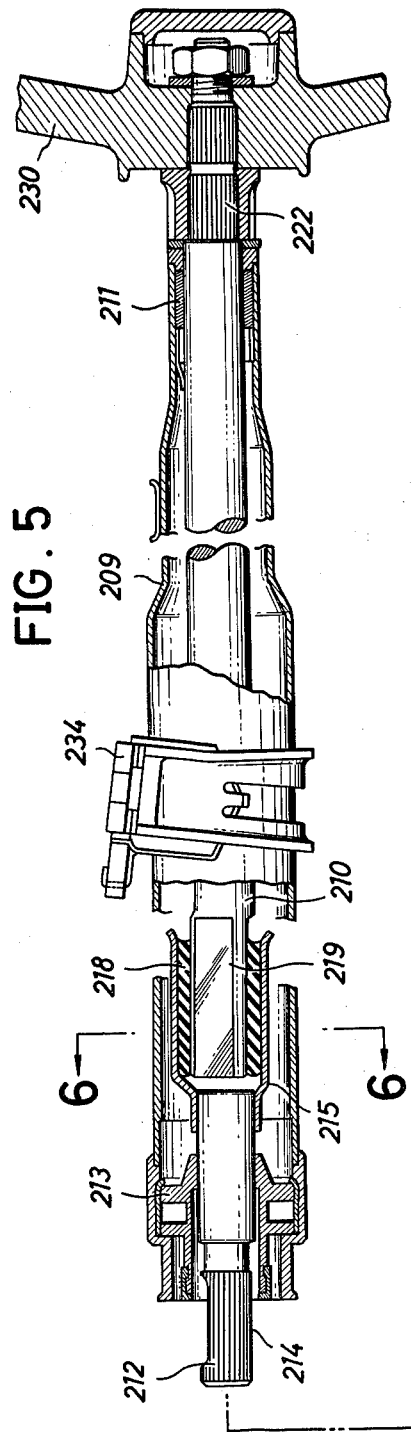
FIG. 5
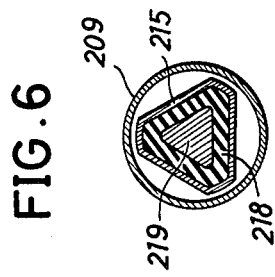
FIG. 6
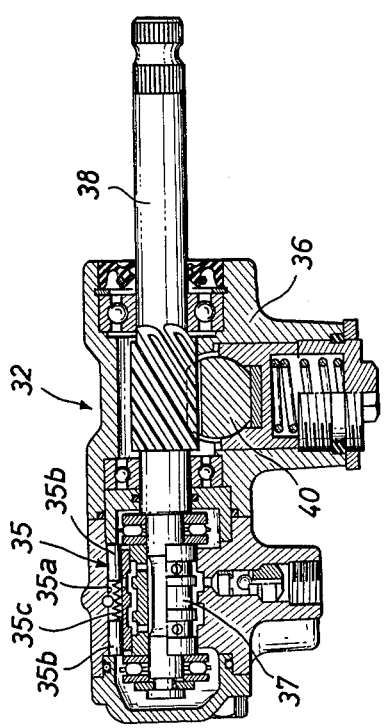

POWER STEERING DEVICE FOR VEHICLES

BACKGROUND OF THE INVENTION

1. Field of the Invention

The present invention relates to a power steering device for vehicles, and more particularly to a variable-steering-ratio steering device having a steering ratio which is variable relative to angular movement of a steering wheel.

2. Description of Relevant Art

A steering ratio on power steering devices employing hydraulic pressure for powered steering is determined from the standpoint of the steering handling during stopping or low-speed travel of a vehicle, as well as the straight-moving stability during high-speed travel. However, it is impossible to have a fixed steering ratio which successfully meets both of such requirements. While the vehicle is at rest or moving at a low-speed, it is desirable to have as small a steering ratio as possible so as to turn dirigible wheels through a relatively large angle in response to a slight turning of the steering wheel. While the vehicle is running at a high speed, the steering ratio should be large enough to prevent oversteering so as to ensure stability of the vehicle.

In an effort to meet such requirements, there has been proposed and employed a variable-gear-ratio steering device for varying the gear ratio of a steering gear in response to the turning of the steering wheel in such a manner that the gear ratio is relatively large when turning of the steering wheel is slight, and becomes progressively smaller as the turning becomes greater.

Such known devices, however, are complicated in structure and require precise machining during manufacture because the variable gear ratio is determined by the variable-pitch rack of a rack-and-pinion steering gear. Furthermore, it has been impossible to provide a required range of variable gear ratio while at the same time permitting the driver to steer the vehicle smoothly.

The present invention provides a steering device having a vehicle speed sensor driven in proportion to the road surface resistance acting on the vehicle wheel, and a reaction force mechanism cooperating with the vehicle speed sensor, for giving the driver a steering reactive force which becomes heavier with increasing vehicle speed.

SUMMARY OF THE INVENTION

The present invention provides a power steering device for vehicles which includes powering means for providing wheels of a vehicle with power assistance when the vehicle is steered. Control means are provided for controlling the powering means in accordance with a steering direction of a steering wheel of the vehicle. Returning means normally urge the control means to a neutral position thereof. Resilient means are disposed between the returning means and the steering wheel for rotational displacement with a substantially linear spring constant, responsive to the steering torque, so as to thereby provide a variable steering ratio. The returning means and the steering wheel are interconnected by the resilient means.

According to the invention, resilient means such as a torsion bar extends entirely through a hollow steering shaft and connects a steering wheel with an output shaft. When the steering wheel is turned, the torsion bar is angularly flexed or twisted linearly an angular extent so as to allow the steering wheel to be turned ahead of the output shaft. The steering wheel and the output shaft can be turned together beyond such angular extent determined by the vehicle speed. The torsion bar may be disposed in a hollow pinion shaft. The resilient means may comprise a sheath of rubber disposed around an end portion of a steering shaft and connected to a tubular joint fixed to the output shaft. The steering shaft and the steering wheel are interconnected by a tongue-and-groove connection allowing angular movement therebetween, so that excessive mutual angular displacement thereof can be avoided so as to protect the resilient means.

It is an object of the present invention to provide a variable-steering-ratio power steering device having a steering ratio which is variable relative to vehicle speed.

Another object of the present invention is to provide a variable-steering-ratio power steering device which is simplified in structure, small in size, light in weight, and durable in operation.

Still another object of the present invention is to provide a variable-steering-ratio power steering device having a maximum range of variable steering ratio.

A further object of the invention is to provide a variable-steering-ratio power steering device which is adaptable to existing vehicles with a minimum exchange of parts.

The above and further objects, features and advantages of the present invention will become apparent from the following description when read in conjunction with the accompanying drawings.

BRIEF DESCRIPTION OF THE DRAWINGS

FIG. 1 is a view, partially in cross section, of a steering column coupled with a steering gear and a power steering device.

FIG. 2 is a graph showing steering characteristics according to the power steering device.

FIG. 5 is a view similar to FIG. 1, showing a steering column according to another embodiment of the invention.

FIG. 6 is a cross-sectional view taken along line 6—6 of FIG. 5.

DETAILED DESCRIPTION OF PREFERRED EMBODIMENTS

Figure 4:
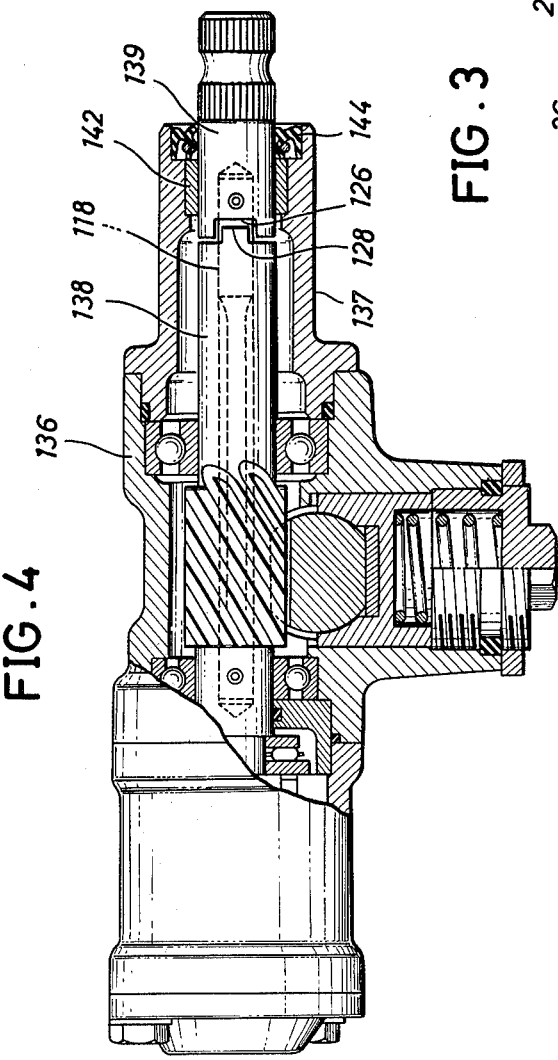
FIG. 4 is a cross-sectional view of a steering gear, showing a modification thereof.

With reference to FIG. 1, a hollow steering shaft 10 mounted for rotation with a steering wheel 30 is rotatably disposed in a tube 9 and journaled in a pair of bearings 11, 13 at both respective ends. The steering shaft 10 is connected at its one end (the left-hand end in FIG. 1) with an output shaft 14 which is peripherally serrated or knurled therearound. The output shaft 14 has a coaxial projection 15 inserted in the steering shaft 10 and coupled therewith by a faucet joint. The output shaft 14 has circumferentially spaced keys or splines 16 received respectively in angularly spaced slots 17 formed in the steering shaft 10. The steering shaft 10 and the output shaft 14 thus mechanically connected together are further joined to each other such as by brazing, thereby providing increased mechanical strength against excessive forces to which they would be subjected upon failure of the hydraulically powered steering device.

A torsion bar 18 extends entirely through the hollow steering shaft 10 and has its one (or left-hand) end fitted securely in an axial hole 19 provided in projection 15 of output shaft 14. An input shaft 22 is fixedly mounted on a steering wheel 30 and has an axial extension rotatably mounted at 20 in the other end (right-hand in FIG. 1) of the steering shaft 10. The input shaft 22 is connected to the other (or right-hand) end of torsion bar 18 by a spring pin 24, and is connected resiliently to the steering shaft 10 through the torsion bar 18.

Figure 3:
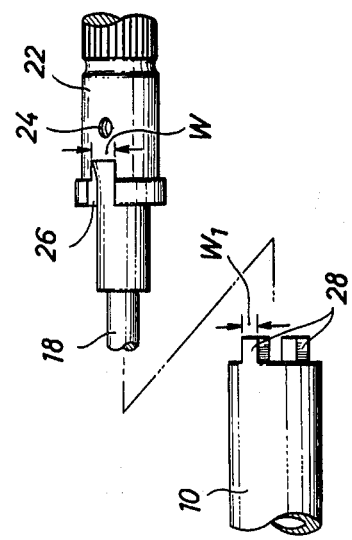
FIG. 3 depicts a safety structure.

A stopper mechanism is provided for limiting mutual angular movement of the input shaft 22 and the steering shaft 10 within a predetermined angle in order to restrain a torque on the torsion bar within a predetermined limit so that the torsion bar will be prevented from being broken upon failure of the power steering device. More specifically, with reference to FIG. 3, the input shaft 22 has at one end a pair of axial grooves 26 having a width W and angularly spaced 180° from each other. The steering shaft 10 has at its one end proximal to the input shaft 22 a pair of tongues 28 having a width $W_1$ which is smaller than the width W of the grooves 26.

In assembly, the tongues 28 are placed centrally in the grooves 26 so as to be able to move laterally in both directions an equal amount, and then a hole for the spring pin 24 is formed. The steering shaft 10 is then connected to output shaft 14 and input shaft 22, after which the steering shaft 10 is inserted in tube 9, with output shaft 14 being coupled with a power steering device 32 by a suitable coupling member. The tube 9 is provided with brackets 33, 34 welded thereto and fixed to a vehicle body by means of suitable fasteners such as nuts and bolts.

The power steering device 32 is of the rack-and-pinion type including a pinion shaft 38 mounted in a casing 36 for rotation with steering shaft 10. Rotational motion of pinion shaft 38 is converted to linear motion of a rack 40, which causes angular turning of dirigible wheels through a link mechanism well known in the art. At the same time, the pinion shaft 38 actuates a four-way valve 37, which in turn actuates a hydraulic cylinder having a piston connected to the rack 40 for hydraulic power assistance to the steering wheel. The power steering device 32 also includes a reaction force mechanism 35 for providing the driver with a steering reactive force which becomes greater as the car speed increases, the mechanism 35 comprising a hydraulically pressurized reactive chamber 35a, plungers 35b, and springs 35c. The reaction force mechanism 35 further includes a control valve for limiting a reactive force proportional to a road-surface resistance to a predetermined value above a given road-surface resistance. The power steering device 32 is of the type disclosed in U.S. Pat. No. 3,994,361 which issued Nov. 30, 1976, and is assigned to the present assignee.

Figure 7:
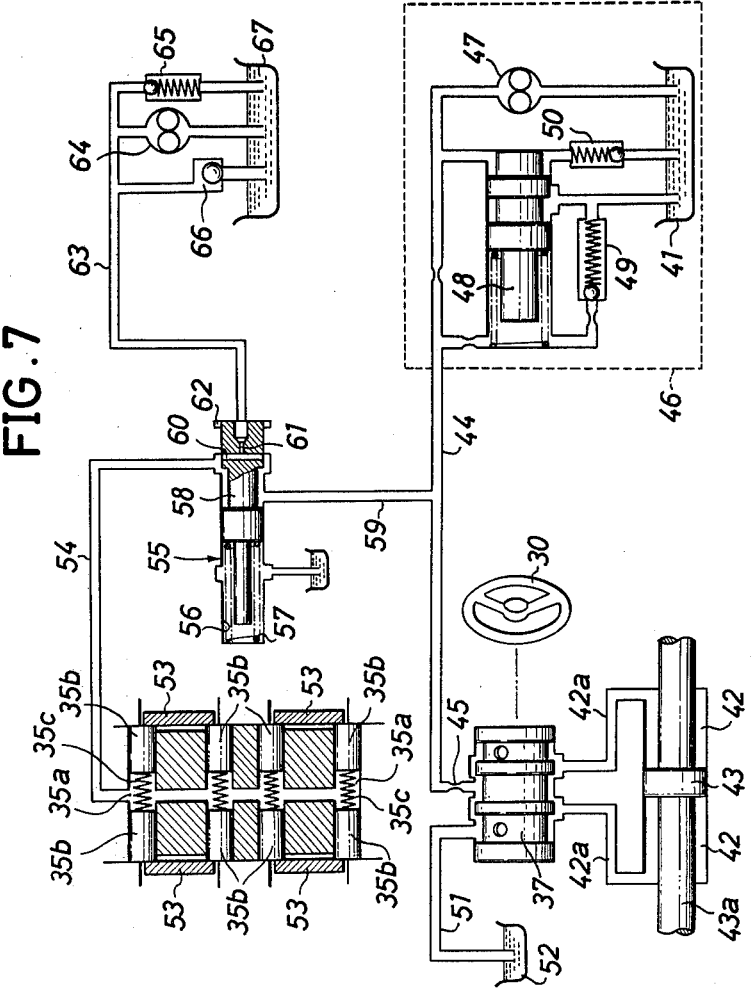
FIG. 7 is a diagrammatic illustration of a hydraulic circuit for the power steering device.

With reference to FIG. 7, the four-way changeover valve 37 is connected to the steering wheel 30 and to a selective one of opposite chambers 42, 42 by conduits 42a, 42a. The chambers 42, 42 are defined by a piston 43 on a piston rod 43a connected to rack 40. The changeover valve 37 is connected through an oil passage 44 with a throttle 45 to a source 46 of fluid pressure. The fluid pressure source 46 includes an oil tank 41, an engine-driven pump 47, a flow-control valve 48, a relief valve 49, and a check valve 50. The changeover valve 37 is further coupled via a passage 51 to an oil tank 52.

The plungers 35b are paired and are normally urged apart by the springs 35c against flanges 53. The reactive chamber 35a defined between each pair of plungers 35b is connected via a passage 54 to a control valve 55. The control valve 55 is slidably disposed in a valve chamber 56 and is normally urged to the right under the force of a spring 57. The valve 55 includes a groove 58 through which the passage 54 communicates with a passage 59 extending from the passage 44. The valve 55 also includes a bore 60, a throttle 61, and an oil pressure chamber 62, with which communicates a passage 63 connected to an exhaust pump 64 driven by a speedometer- or counter-shaft of the vehicle, a relief valve 65, and a check valve 66, all coupled with an oil tank 67.

When the vehicle is at a stop, control valve 55 is moved to the left against the force of spring 57, thereby blocking communication between passage 54 and passage 59. If the steering wheel is turned at such time, the changeover valve 37 is moved in either direction, permitting the oil pressure in passage 44 to act on piston 43 so as to give the steering wheel power assistance. Because passage 59 is prevented from communicating with passage 54, the oil pressure generated in chamber 42 and thus in passage 44 corresponding to the road surface resistance does not act in the oil pressure reaction chamber 35a. When the steering wheel 30 is turned while the vehicle is running, the oil pressure build-up in passage 44, corresponding to the road surface resistance at the time, acts in the reaction chamber 35a through control valve 55 which is then moved to the right because the oil in passage 63 is drawn into tank 67 by the operation of pump 64. Then, the oil under pressure in passage 54 flows into passage 63, building up the pressure therein, so that control valve 55 is closed again.

Therefore, as shown in FIG. 2, a steering torque or force required to turn the steering wheel during stopping of the vehicle (V=0) is substantially uniform and of a low value, regardless of the degree of road surface resistance acting on the dirigible wheel. During high speed travel of the vehicle, the steering torque required is increased in proportion to the road surface resistance for the curve O-A, and is increased at a reduced rate in proportion to the road surface resistance for the curve A-V∞. For intermediate vehicle speeds such as $v_1$, $v_2$, $v_3$, the characteristic curve for the steering torque becomes substantially flat after it reaches its maximum value corresponding to the vehicle speed. The straight line O-M in FIG. 2 indicates the steering torque characteristic when the steering wheel is not power-assisted, and its inclination is inversely proportional to the steering ratio.

According to a modification shown in FIG. 4, a hollow pinion shaft is divided into an input shaft 139 and an output shaft 138 interconnected by a torsion bar 118 for co-rotation and against axial sliding movement. The input and output shafts 139, 138 are coupled together by grooves 126 and tongues 128 which are interfitted together. A casing 136 has an axial extension 137 to protect the input shaft 139 from being bent. The input shaft 139 is journaled by a bearing 142 of synthetic resin or by a roller bearing (not shown). A seal 144 is mounted on the casing extension 137 and disposed around the input shaft 139 for preventing mud and water from getting into the casing. The casing extension 137 is coaxially attached to the casing 136 by a faucet joint and is bolted thereto.

With such an arrangement, the torsion bar 118 is provided in the power steering device, and no special adaptation is needed on the steering shaft. The modification of FIG. 4 is advantageous especially where it is necessary to produce vehicles of the same type with and without power steering devices.

Operation of the arrangement according to the present invention will now be described. The steering torque required for steering operation on the power steering device being operated normally while the vehicle is at rest is indicated by the curve $V=0$ in FIG. 2, and is smallest; the torque being progressively increased in proportion to the road surface resistance only for the zone O-B. As the steering torque increases, just after the steering wheel starts to be turned, the torsion bar 18, 118 becomes twisted and the input shaft 22, 139 is ahead of the output shaft 14, 138 in angular motion only for the zone O-B. Even if the road surface resistance is increased beyond the zone O-B, the torsion bar 18, 118 does not twist further, permitting the input and output shafts to be turned together in synchronism. During such synchronized turning, the steering ratio, which is the ratio between the number of degrees through which the steering wheel 30 is turned and the number of degrees through which the front wheels turn, is dependent solely on the gear ratio of the steering gear and the geometric arrangement of the steering links. The steering ratio is relatively large only in the zone O-B because of the difference in angular motion between the input and output shafts. Accordingly, the vehicle while at rest can be readily steered with a light force due to a small steering ratio for substantially all degrees of road surface resistance.

While the vehicle is running at a speed of $v_1$ (FIG. 2), the steering torque characteristic curve is composed of a zone O-A in which the torque is proportional to the road surface resistance, a zone A-$C_1$ in which the torque is proportional at a reduced rate to the road surface resistance, and a zone $C_1$-$v_1$ in which the torque is constant no matter how large the road surface resistance may be. Accordingly, the steering ratio is relatively large in the zone O-A, becomes smaller in the zone A-$C_1$, and is smallest in the zone $C_1$-$v_1$. With the steering ratio being thus gradually reduced, the driver can enjoy natural and smooth steering without abrupt changes in steering torque required.

During high-speed running of the vehicle, the steering ratio is relatively large at all times as evidenced by the curve A-$V_\infty$ in FIG. 2. Because the steering operation will be effected only where the road surface resistance is small during high-speed travel of the vehicle, the overall steering ratio is relatively large.

When power assistance is not available due to failure of the power steering device, for example, the tongues 28 are held forcibly against the walls of the grooves 26 in the input shaft 22 even if the steering torque is increased after the torsion bar 18, 118 has sufficiently twisted, thereby preventing breakage of the torsion bar and permitting transmission of excessive torques.

The variable-steering-ratio steering device of the present invention can be readily obtained by adding resilient means such as a torsion bar to an existing power steering device, can thus be manufactured easily without manufacturing errors, and is durable in operation. Heretofore, where the gear ratio of a steering gear was made variable, the returning torque for the steering wheel was decreased. However, with the steering device in accordance with the present invention, such returning torque is not adversely affected.

The resilient means of the present invention is not limited to the torsion bars, but may be of other shapes and material, such as rubber, which can produce rotational displacement with a linear spring constant within a steering torque corresponding to a maximum angle of turning ($\pm 45°$ in general) of the steering wheel during high-speed travel of the vehicle.

FIGS. 5 and 6 illustrate another embodiment of the present invention in which the resilient means is made of rubber. Like or corresponding parts are indicated by the same reference numerals as those in FIG. 1, with a prefix 2 attached. The parts of the power steering device, being identical in structure, are indicated by the same numerals as those in FIG. 1.

With reference to FIGS. 5 and 6, a steering shaft 210 has at a distal end thereof a joint 219 of a triangular cross-section made such as by forging, there being a sheath 218 of rubber disposed around the joint 219 and bonded thereto. A tubular joint 215 of a triangular cross section surrounds the rubber sheath 218 and is secured to an output shaft 214 such as by welding. The flexibility of the rubber sheath 218 is relied upon for variable steering ratios.

The rubber sheath 218 can flex in an angular moving direction linearly through 3°-5°, or up to approximately 10° as measured in terms of angular movement of the rubber sheath by rotation of a steering wheel 230. When the steering torque is relatively large, such as when the road surface resistance is large, rotational displacement is not transmitted to pinion shaft 38. When the steering torque is relatively small, the rubber sheath 218 is not substantially flexed and the steering force is transmitted to the pinion shaft 38 without being attenuated. Accordingly, the degree of flexibility of the rubber sheath 218 is variable with the steering torque for variable steering ratios.

Where the illustrated structure is not employed, there may be provided a stopper between the shaft 210 and the joint 215 to cause direct engagement therebetween when they angularly move beyond 10°, for limiting the flexing of the rubber sheath. Such alternative arrangement can be understood with reference to FIG. 3.

Although the present invention has been illustrated as applied to a power steering device having a steering reactive mechanism responsive to vehicle speeds, the present invention is also applicable to a power steering device having a mechanism for controlling a steering reactive force based upon a signal related to the number of revolutions of an engine, insofar as it has connection with the road surface resistance. It should be understood that the present invention is applicable to a power steering device without a reactive mechanism, having a single characteristic in which the steering torque is directly related to the road surface resistance.

Although certain preferred embodiments of the present invention have been shown and described, it should be understood that changes and modifications may be made therein without departing from the scope of the invention as defined in the appended claims.

I claim:

1. A power steering device for vehicles, comprising:
    powering means for providing wheels of a vehicle with power assistance when the vehicle is steered;
    control means for controlling said powering means in accordance with a steering direction of a steering wheel of the vehicle;

returning means for normally urging said control means to a neutral position thereof;

resilient means disposed between said returning means and said steering wheel for rotational displacement with a substantially linear spring constant, responsive to the steering torque, so as to thereby provide a variable steering ratio; and said returning means and said steering wheel being interconnected by said resilient means.

2. A power steering device according to claim 1, including:

a steering reaction means having a reactive force limiting mechanism for producing a steering reactive force which increases in proportion to the road surface resistance acting on the vehicle wheels and for producing a steering reactive force which is substantially constant beyond a predetermined value of the road surface resistance.

3. A power steering device according to claim 1, including:

a steering reaction means for increasing a steering reactive force with an increase of vehicle speed or the number of revolutions of an engine.

4. A power steering device according to claim 1, 2 or 3, including:

a hollow steering shaft connected to said steering wheel, said resilient means being disposed in said hollow steering shaft.

5. A power steering device according to claim 1, 2 or 3, wherein:

said powering means includes a hollow pinion shaft, said resilient means being disposed in said hollow pinion shaft.

6. A power steering device according to claim 1, 2 or 3, including:

means for mechanically coupling said returning means and said steering wheel for torque transmission when an excessive deforming torque is applied to said resilient means beyond said substantially linear spring constant.

7. A power steering device according to claim 1, wherein:

said resilient means comprises a torsion bar.

8. A power steering device according to claim 1, 2 or 3, wherein:

said resilient means is made of rubber and is flexible linearly in the range of substantially 3° to 10° as measured in terms of angular movement of said resilient means by rotation of the steering wheel.

9. A power steering device according to claim 1, wherein:

a steering shaft is interconnected with said steering wheel by a tongue-and-groove connection adapted to limit mutual angular movement between said steering wheel and said steering shaft.

* * * * *